United States Patent [19]

Tsurushima et al.

[11] Patent Number: 5,244,705
[45] Date of Patent: Sep. 14, 1993

[54] DISC-SHAPED RECORDING MEDIUM

[75] Inventors: Katsuaki Tsurushima; Tadao Yoshida, both of Kanagawa, Japan

[73] Assignee: Sony Corporation, Japan

[21] Appl. No.: 746,967

[22] Filed: Aug. 19, 1991

[30] Foreign Application Priority Data

Aug. 24, 1990 [JP] Japan .................................. 2-222823

[51] Int. Cl.$^5$ .............................................. B32B 3/00
[52] U.S. Cl. ........................................ 428/64; 428/65;
428/913; 346/76 L; 346/135.1
[58] Field of Search ........................... 428/64, 65, 913;
369/272, 275.3, 282, 290; 346/76 L, 135.1;
430/270

[56] References Cited

U.S. PATENT DOCUMENTS 4,855,979  8/1989  Kimura .................................. 369/33
4,871,404 10/1989  Murata .................................. 369/282

Primary Examiner—Patrick J. Ryan
Assistant Examiner—Elizabeth Evans
Attorney, Agent, or Firm—Alfred A. Equitz

[57] ABSTRACT

A disc-shaped recording medium for storing compressed audio data which have been recorded thereon by an optical recording apparatus. The inner diameter of a data recording region of the disc-shaped recording medium is in the range from 28 mm to 50 mm. The outer diameter of the data recording region is in the range from 58 mm to 62 mm for an inner diameter of 28 mm, and is in the range from 71 mm to 73 mm for an inner diameter of 50 mm. The disc-shaped recording medium may be used with a small-sized portable disc recording and reproducing apparatus, and can record compressed audio data for playback with a playback time substantially as long as that of a standard compact disc having 12 cm diameter.

10 Claims, 10 Drawing Sheets

| 1 BYTE | | | |
|---|---|---|---|
| 00H | FFH | FFH | FFH |
| FFH | FFH | FFH | FFH |
| FFH | FFH | FFH | 00H |
| MIN | SEC | BLOCK | MODE |
| D0001 | D0002 | D0003 | D0004 |
| D0005 | D0006 | D0007 | D0008 |
| D0009 | D0010 | D0011 | D0012 |
| | | | |
| D2329 | D2330 | D2331 | D2332 |
| D2333 | D2334 | D2335 | D2336 |

FIG. 7

| D0001 FILE NUMBER | D0002 CHANNEL NUMBER | D0003 SUBMODE | D0004 DATA TYPE |
|---|---|---|---|
| D0005 FILE NUMBER | D0006 CHANNEL NUMBER | D0007 SUBMODE | D0008 DATA TYPE |

FIG. 8

DISC-SHAPED RECORDING MEDIUM

BACKGROUND OF THE INVENTION

1. Field of the Invention

This invention relates to an disc-shape recording medium. More particularly, it relates to a disc-shaped recording medium on which compressed audio PCM data are recorded and which may be advantageously employed in a small-sized portable disc recording/reproducing apparatus.

2. Summary of the Invention

The present invention provides a disc-shaped recording medium in which compressed audio data are recorded by optical means wherein, with the inner diameter of a data recording region of a disc being set to a predetermined value within a range of 28 to 50 mm, the outer diameter of the data recording region for inner diameter of said data recording region of 28 mm is set in a range from 58 to 82 mm and said outer diameter for said inner diameter of 60 mm is set in a range from 71 to 73 mm, whereby the recording medium may be used with a small-sized portable disc recording/reproducing apparatus and a playback time about as long as that of a standard 12 cm CD may be realized by recording compressed audio data having the compression rate of e.g. ¼.

DESCRIPTION OF RELATED ART

An optical disc may have a recording capacity larger by two or three digits than that of a magnetic disc, while enabling accessing at a higher speed than that for a tape recording medium. The optical disc also has an advantage that it enables contactless data recording/reproduction on or from the medium, and is superior in durability, and hence has become more popular in recent years. A so-called compact disc (CD) is among the widely known types of the optical discs.

Meanwhile, for providing a portable and, above all, a pocketable headphone stereo or similar recording/reproducing apparatus, with the use of the optical disc, a compact disc with a disc diameter of 12 cm and a compact disc with a disc diameter of 8 cm (so-called CD single) have been prescribed, as long as the disc format is concerned. However, with the disc diameter of 12 cm, the recording/reproducing apparatus becomes too bulky to be portable. Therefore, a disc 8 cm or less in diameter may be thought to be convenient. However, if it is attempted to construct a portable or pocket size recording and/or reproducing apparatus with the use of an optical disc 8 cm or less in diameter, the following problem is raised.

In the case of a standard CD format, in which an optical disc, on which are recorded stereophonic digital PCM audio signals sampled with a sampling frequency of 44.1 kMz and quantized by 16 bits, is supplied by a producer, and in which these signals are exclusively reproduced by the user (CD-DA format), the playback time (recording time) of the disc which is 8 cm in diameter of 20 to 22 minutes at most, meaning that a symphony of classical music can not be recorded completely on one disc side. The playback time of 74 minutes or longer, which is approximately equal to that of the compact disc 12 cm in diameter, is desired. Moreover, with this CD-DA format, recording by the user is not feasible. In addition, a contactless type optical pickup device is vulnerable to mechanical vibrations and subject to detracking or defocusing. Thus, when the apparatus is to be portable, some strong measures need to be taken to prevent adverse effects of detracking or defocusing on the recording operation.

With the CD-I (CD-interactive) format, the levels A to C as shown in the following Table 1 are prescribed as a modes for recording/reproducing bit-compressed digital audio signals.

TABLE 1

| levels | sampling frequency | number of bits for quantization | bandwidth | playback time (stereo/monaural) |
|---|---|---|---|---|
| A | 37.8 kHz | 8 | 17 kHz | 2/4 |
| B | 37.8 kHz | 4 | 17 kHz | 4/8 |
| C | 18.9 kHz | 4 | 8.5 kHz | 8/16 |

When reproducing a disc recorded with, for example, the level B mode, signals obtained by fourfold bit compression of standard CD-DA format digital signals are reproduced. This, if all of the recorded data are stereophonic audio compressed data, playback time becomes fourfold, or reproduction of eight-channel data, becomes possible, so that reproduction for 70 minutes or longer becomes possible with an optical disc of the order of 6 cm in diameter.

Meanwhile, with the CD-I format, the disc is rotationally driven at the same linear velocity as that for the standard CD-DA format, so that the continuous audio compressed data are reproduced at a rate of one unit to n reproducing units on the disc, where n is a figure corresponding to the playback time or the bit compression rate of data and is equal to 4 (n=4) with the level B stereo mode. This unit is termed a block or sector which is made up of 98 frames and has a period of 1/75 second. Therefore, with this level B stereo mode, a data string in which one of four sectors is an audio sector such as

S D D D S D D D ....

where S is an audio sector and D is other data sector or sectors, is recorded on the sector-by-sector basis on the disc. However, for actual recording, since the above data string undergoes a predetermined encoding similar to that for ordinary CD format audio data, such as error correction coding and interleaving, data of the audio sector S and data of the data sector D are arranged in a scrambled fashion in the recording sectors on the disc. The other data sectors D may for example be video or computer data. When the bit-compressed audio signals are also used for the data sector D, a data string in which four-channel audio sectors S1 to S4 are cyclically arranged, that is a data string

S1 S2 S3 S4 S1 S2 S3 S4 .....

is encoded and recorded on the disc. When recording and reproducing continuous audio signals, channel 1 data corresponding to the audio sector S1 are reproduced from the innermost to the outermost sides of the disc. Channel 2 data corresponding to the audio sector S2 are then reproduced from the innermost to the outermost sides of the disc. Subsequently, channel 3 data corresponding to the next audio sector S3 are reproduced from the innermost to the outermost sides of the disc. Finally, channel 4 data corresponding to the audio sector S4 are reproduced from the innermost to the outermost sides of the disc to enable data reproduction for a continuous fourfold time duration.

However, for the above mentioned continuous reproduction, several track jump operations for a longer distance spanning the inner and outer disc peripheries are necessitated. Since the track jump can not be achieved instantaneously, playback data become depleted for a short time period, meaning that the playback sound is momentarily interrupted. On the other hand, when continuous audio signals are to be recorded, it is not possible to record only the sector S2 signals, as an example, because the data need to undergo interleaving at the time of recording. That is, sector S2 data need to be interleaved with adjoining and even near-by sectors, such as sectors S1 and S3, such that it becomes necessary to rewrite signals of previously recorded sectors. Thus it is extremely difficult to record the continuous compressed audio data, while real-time processing is virtually impossible.

If these drawbacks could be eliminated, a recording/reproducing time almost as long as or even longer than that of a standard 12 cm CD could be realized with an 8 cm disc or a disc of a lesser outer diameter. In such case, the sizes of various disc parts need to be selected to optimum values by taking account of the demand for size reduction of the disc recording/reproducing apparatus and a recording capacity of the disc. Such selection of the sizes of the various disc parts is critical because it affects not only the size of the disc recording reproducing apparatus but also the use feel and the possibility of coming into widespread use of the apparatus.

OBJECTS AND SUMMARY OF THE INVENTION in view of the above described status of the art, it is a principal object of the present invention to provide a disc-shaped recording medium on which compressed audio data are or the like are recorded, whereby a moderate recording/reproducing time may be assured as a disc-shaped recording medium having compressed audio data or the like recorded thereon and with which the disc size may be such as to meet the demand for size reduction of the recording/reproducing apparatus.

With the disc-shaped recording medium according to the present invention, the inner diameter of the data recording region of the disc is set so as to be within a range of 28 to 50 mm, and the outer diameters of the data recording region for said inner diameter of 28 mm and 60 mm are set so as to be in a range of 58 to 62 mm and in a range of 71 to 73 mm, respectively.

By setting the inner and outer diameters of the disc recording region in this manner, a recording/reproducing time of about 60 minutes at the minimum and about 72 to 76 minutes on an average may be achieved by recording compressed audio data with the compression rate of $\frac{1}{5}$ at a track pitch of 1.6 $\mu$m and a linear velocity of 1.2 to 1.4 m/s.

Turning to the above conditions more specifically, if, with the use of a disk of the same shape of the compact disc, the inner diameter of the disc recording region is less than 32 mm, the optical head travelling radially inwardly thrusts on a disc driving spindle because the lead-in region has an inner diameter still less than the inner diameter of the disc recording region. The optical head is restricted in the manner in its movement and becomes unable to trace the lead-in region. In the case of a disc which can be chucked or clamped positively with a shorter width, such as a disc in which a protuberance is formed around a centering hole on one major surface of the disc base plate, it is possible to reduce the width of chucking or clamping further, so that the optical head may be moved further towards the inner side of the disc and hence the inner diameter of the data recording region may be reduced to 28 mm. Turning again to the above conditions, if the data recording region is larger than 73 mm, the recording region is approximately of the same size as the ordinary 8 cm CD and hence the demand for size reduction of the disc recording/reproducing apparatus cannot be met sufficiently.

BRIEF DESCRIPTION OF THE DRAWINGS

FIG. 6 shows a format of a cluster structure constituting a recording unit.

FIG. 7 shows a typical data structure of a sector or block.

FIG. 8 shows the contents of a sub-header.

EMBODIMENT

Figure 1:
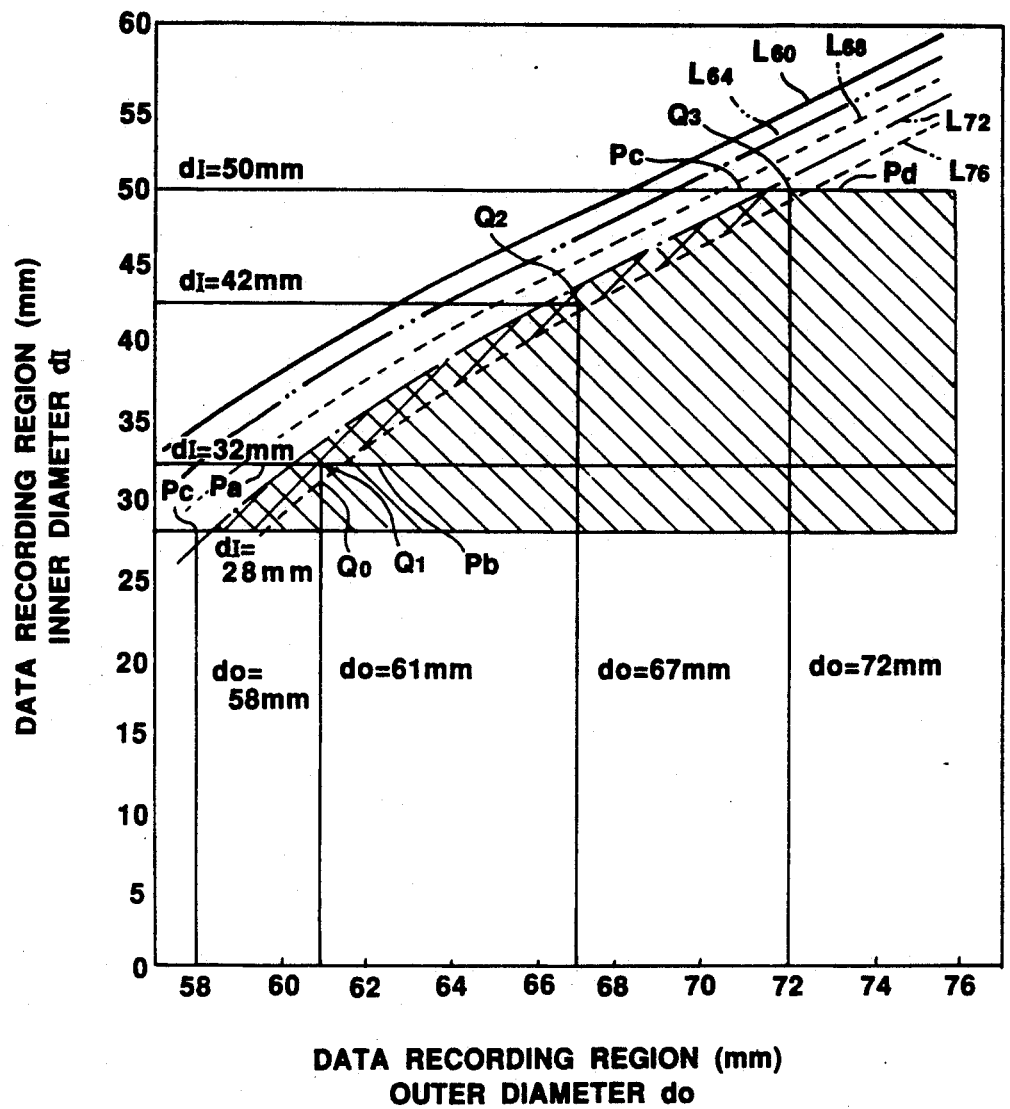
FIG. 1 is a graph showing the relation between the inner diameter and the outer diameter of a data recording region of a disc-shaped recording medium embodying the present invention.
Figure 2:
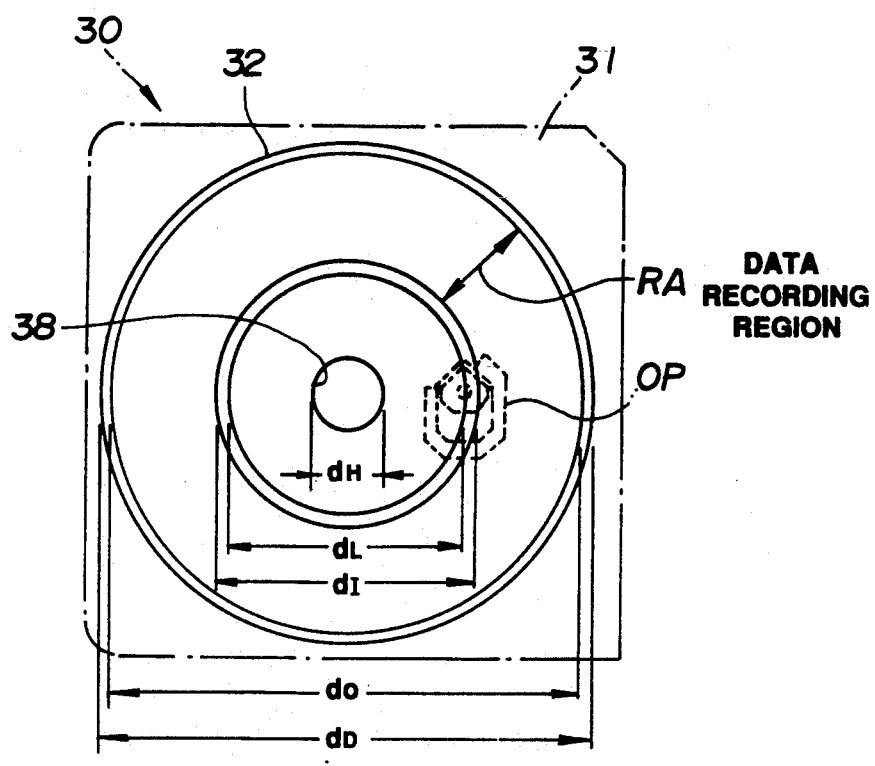
FIG. 2 is a plan view showing a disc-shaped recording medium.
Figure 3:
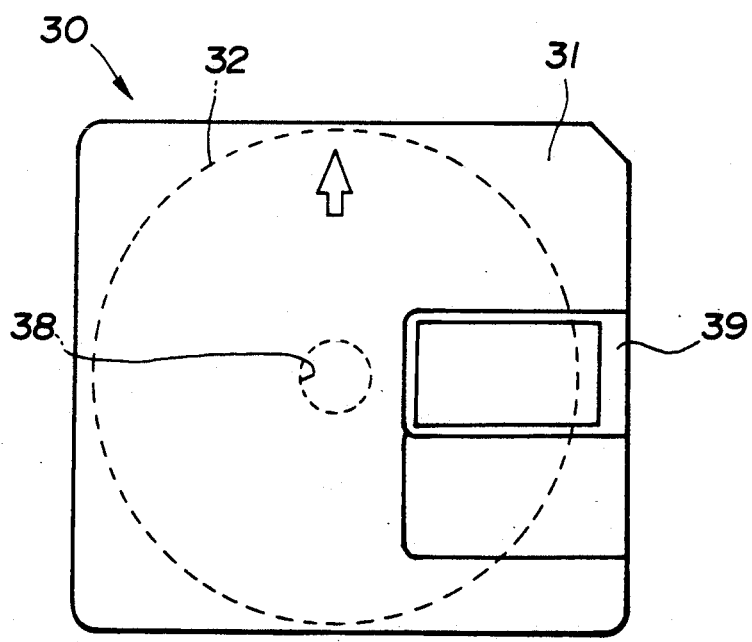
FIG. 3 shows a schematic plan view showing the disc-shaped recording-medium accommodate in a cartridge.

An embodiment of the disc-shaped recording medium according to the present invention will be explained by referring to FIG. 1 to 3. FIG. 1 shows an inner diameter and an outer diameter of a data recording region of a disc-shaped recording medium embodying the present invention. FIG. 2 is a plan view of the disc shaped recording medium and FIG. 3 is a schematic plan view showing the recording medium accommodated in a cartridge or caddy.

Referring to FIG. 2, the disc-shaped recording medium, such as a magneto-optical disk, has a central hole of a diameter $d_H$, or a centering hole 38, into which a spindle, not shown, is introduced and chucked for rotationally driving a disc 32. The disc 32 is inserted into a cartridge or disc caddy 31 shown in FIG. 3 to constitute a disc apparatus 30. A shutter plate 39 or the like is movably mounted on the cartridge S1.

Turning again to FIG. 2, the disc S2 has a data recording region RA having an inner diameter $d_I$ and an outer diameter $d_O$ A lead-in region or table of contents (TOC) region is provided inwardly of the data recording region RA which has an inner diameter $d_L$. A region defined between the data recording region RA and an outer disc diameter $d_D$ is a so-called rim region. An optical head OP shown by a broken line in FIG. 2 is shown tracing an innermost track of the lead-in region (with an inner diameter $d_L$).

Turning to a graph of FIG. 1, the outer diameter $d_O$ and the inner diameter $d_I$ of the data recording region RA are plotted on the abscissa and the ordinate, respectively. Five curves $L_{60}$, $L_{64}$, $L_{68}$, $L_{72}$, and $L_{76}$, in the figure represent the relation between the outer diameter $d_O$ and the inner diameter $d_I$ which will give the recording reproducing time duration for the CD-I format level B stereo mode. The other conditions of the recording format of the disc are similar to those of the standard CD format (CD-DA format) and include, for example, a track pitch of 1.6 μm and a inner velocity of 1.2 m/s.

Although the lower limit for the inner diameter $d_I$ of the data recording region RA is preferably 28 mm, the lower limit is preferably 32 mm for a disk flat on both sides, similarly to the usual compact disk, in consideration of the width necessary for head that may be achieved under the present status of the art, with the inner diameter $d_I$ of 32 mm, the inner diameter $d_L$ of the lead-in region is of an order of 30 mm. Since the diameter $d_H$ of the centering hole 38 of 10 mm at most is required, a space as small as about 10 mm may be conserved on one side of the centering hole 38 between the centering hole 38 and the inner periphery of the lead-in region. Since an allowance for chucking and clamping is required in the proximity of the centering hole 38, the size of the optical head between the center and its outer wall is limited to 10 mm less the above mentioned width for chucking and clamping, which is close to the minimum size of the optical head that may be realized at the present time. In light of the foregoing, it is necessary to set the lower limit of the inner diameter $d_L$ of the lead-in region and the lower limit of the inner diameter $d_I$ of the data recording region RA to about 30 mm and 32 mm, respectively.

The upper limit of the inner diameter $d_I$ of the data recording region RA is set so as to be equal to the equal to the inner diameter of the standard CD data recording region, or 50 mm, in consideration that a size in excess of the standard CD size gives rise to no particular merit but results only in a reduced recording capacity.

Thus it is preferred that the inner diameter $d_I$ of the data recording region RA be selected within a range of 32 mm to 50 mm.

The outer diameter $d_O$ of the data recording region RA may be determined in dependence upon the inner diameter $d_I$ by taking account of the required value of the recording capacity. Under the present data compression technology, the data compression rate which will satisfy the necessary sound quality, for example, the sound quality of an FM broadcast level, is about ¼ or fourfold at most, such that, for example, the above mentioned level B stereo mode is most desirable. With the order condition being the same as those for the standard CD, and with the linear velocity being 1.2 m/s, the relation between the recording/reproducing time and the inner and outer diameters of the data recording region is as shown by the curve $L_{60}$ to $L_{76}$ to $L_{7s}$ in FIG. 1. On the other hand, an index of a recording/reproducing time most desirable to the user is the recording time for a symphony of classical music, that is, a recording/reproducing time of 74 minutes at the maximum, which is almost equal to that of the currently available 12 cm CD. It will be noted that the diameters $d_O$ to $d_I$ for which the recording/reproducing time of 72 to 76 minutes at the minimum may be assured are encompassed by a cross-hatched region in FIG. 1. If an increase or decrease in the data recording capacity, due to changes in the recording conditions or the like is taken into account, it is preferred to set the outer diameter $d_O$ of the data recording region RA so as to be in a range from 60 to 62 mm (a range between points $P_a$ and $P_b$ in FIG. 1) and in a range from 71 to 73 mm a range between points $P_c$ to and $P_d$ in FIG. 1) for the inner diameters $d_I$ of the data recording region RA of 32 mm and 50 mm, respectively.

As a particular example, one of most desirable values is (the inner diameter $d_I$ of the region RA)=32 mm; and
(the outer diameter $d_O$ of the region RA)=61 mm as shown at $Q_1$ in FIG. 1. As other sizes, for example,
(inner diameter d of the centering hole $d_H$)=10 mm;
(inner diameter of the Lead-in region $d_L$)=30 mm; and
(outer diameter $d_D$ of the disc)=64 mm.

If the disc is accommodated in a cartridge or caddy 70 mm ×74 mm in size and presented in this state to the market, recording and/or reproduction on or from the disc becomes possible with an ultra-small pocket size recording/reproducing apparatus.

As another example of the size,
(inner diameter $d_I$ of the data recording region RA)=42 mm; and
(outer diameter $d_O$ of the data recording region RA)=67 mm as shown at point $Q_2$ in FIG. 1, are also desirable, for which other sizes may be selected so that
(inner diameter of the Lead-in region $d_L$)=40 mm; and
(outer disc diameter $d_D$)=70 mm.

Alternatively, the diameters $d_I$ and $d_O$ may be selected so that
inner diameter $d_I$ of data recording region RA)=50 mm; and
(outer diameter $d_O$ of data recording region RA)=72 mm for which other sizes may be selected so that, for example,
(inner diameter of the lead in region $d_L$)=46 mm; and
(outer disc diameter $d_D$)=76 mm.

It is to be noted that a variety of combinations other than those specified above are possible as long as the above mentioned size conditions are satisfied.

Figure 4:
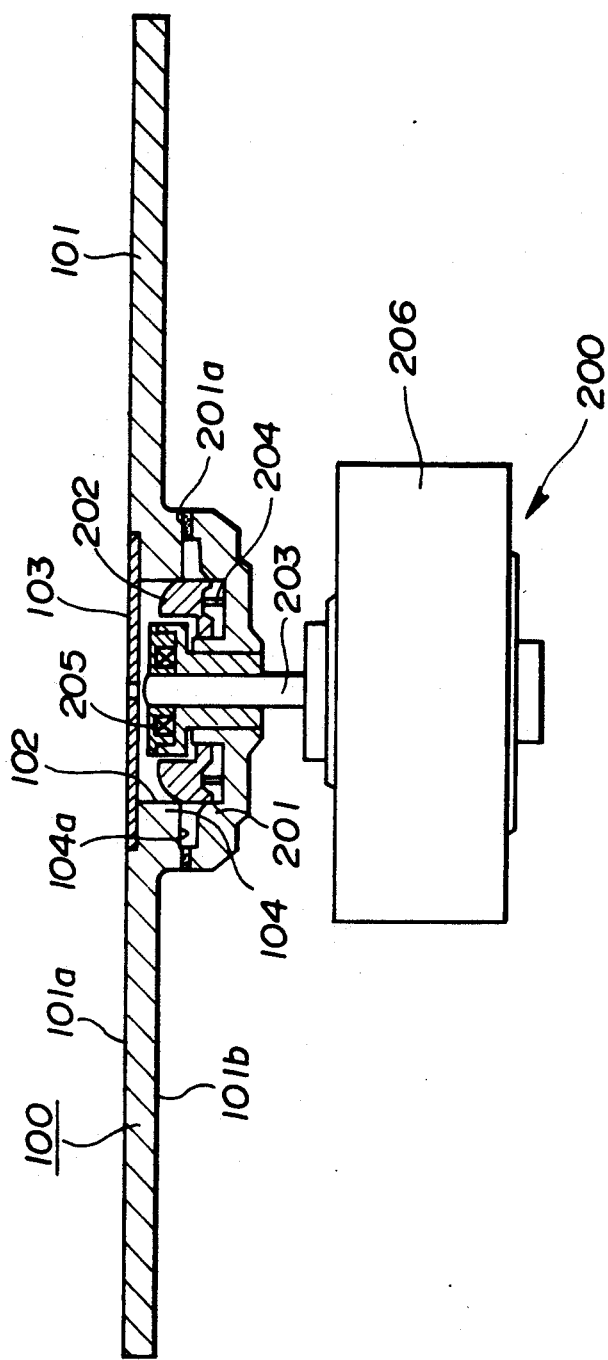
FIG. 4 shows a sectional plan view showing the disc which is loaded on the disc table of the disc driving unit.

The above conditions are those for a disk in the form of a flat plate similar to a compact disc. However, if a disc employed is of a structure in which chucking or clamping may be achieved reliably with a shorter width, the inner diameter d1 of the data recording region RA may be diminished to an order of 28 mm at the minimum. A typical example of the arrangement is a recording disk arranged as shown in FIG. 4. This example is explained by referring to FIG. 4.

Referring to FIG. 4 the disk-shaped recording medium is a magneto-optical disk 100, and a magnetic metal plate placed on one major surface of the disc is attracted by a magnet 205 placed on the disc table 205 for clamping the magneto-optical disc 100 onto the disc table 201.

Referring to FIG. 4, the magneto-optical disc 100 employed in the disk loading system taking advantage of the attractive force of the magnet includes a disk base plate 101 molded from a transparent synthetic resin such as polycarbonate resin, into the shape of a disk. An information signal recording layer for recording information signals is deposited on one major surface 101a of the disk base plate 101. The other surface 101b of the disk base plate 101 opposite to the surface 101a of the disk base plate 101 of the magneto-optical disk 100 carrying the information signal recording layer is an information signal write-read surface and a light beam is irradiated on the signal recording layer from the write-read surface side for recording and/or reproducing the information signals.

The disc base plate 101 has a centering hole 102 engaged by a centering member 202 adapted for bringing the center of rotation of the magneto-optical disc 100 into coincidence with the axis of rotation of the disk table 201 when the disc is loaded on the disc table 201 of the disc driving unit 200. The magnetic metal plate 103 in the form of a flat disc is affixed to a mid portion of the major surface 101a of the disc base plate 101 for closing the centering hole 102 such as with an adhesive.

If the disc base plate 101 of the magneto-optical disc 100 has a thinner thickness of an order of 1,2 mm, the centering hole 102 engaged by the centering member 202 provided on the disc table 201 cannot be of a sufficient depth. In addition, since the metal plate 103 is provided on the major surface 101a of the disc base plate 100 for closing the centering hole, the centering member 202 engaging in the centering hole 102 cannot be of a sufficient height.

The centering member 202 operating for bringing the center of rotation of the magneto-optical disc 100 into coincidence with the axis of rotation of the disk table 201 on loading the magneto-optical disc 100 onto the disk table 201 is mounted so as to be reciprocated axially of the driving shaft 203 supporting the disc table 201 and be biased by a coil spring 204 towards the distal end of the driving shaft 203. When the magneto-optical disc 100 is being loaded onto the disc table 201, the centering member 202 is advanced axially of the driving shaft 203 under the load of the magneto-optical disc 100 against the bias of the coil sprig 204 into engagement with the centering hole 102 for centering the magneto-optical disc 100 with respect to the disc table 201.

For assuring such centering operation, the centering member 202 is of a sufficient height for providing a larger stroke of relative movement between the magneto-optical disc 100 and the centering member 202. That is, the other major surface 101b of the disc base plate 101 opposite to the major surface 101a provided with the metal plate 103 is formed with an annular projection 104 surrounding the centering hole 102 to provide for a sufficient depth of the centering hole 102 and a sufficient height of the centering member 202 to assure positive centering.

Meanwhile, the magneto-optical disc 100, thus centered by the centering member 202 and loaded in this state on the disc table 201, has the end face of the annular projection 104 as a loading reference surface 104a, and is loaded on the disc table 201 with the loading reference surface resting on a disc receiving surface 201a of the disc table 201. When loaded on the disc table 201, the magneto-optical disc 100 is clamped by the metal plate 103 being attracted by a magnet 205 arranged on the disk table 201 and is driven into rotation by a driving motor 206 in unison with the disc table 201.

With the use of the above described disc-shaped recording medium, since a narrower or smaller clamping width suffices for clamping the disc, the inner diameter $d_I$ of the data recording region may be diminished to an order of 28 mm. The fact that the inner diameter $d_I$ of the data recording region may be located at a more inner place of the disc is desirable in view that a disc area with satisfactory characteristics may be utilized effectively. It is noted that, when molding a resin to form a disc, resin is injected at a mold portion facing an inner portion of the disc. While it is extremely difficult to cure the disk in its entirety after resin injection, and it is generally the rim of the disk that is cured first and lowered in characteristics, such as due to bifringence, warping or deterioration in impurity concentration, the inner disk area exhibits satisfactory characteristics, so that it is desirable to utilize this inner disk area effectively. If, in view of possible increase or decrease of the data recording capacity caused by changes in the recording conditions or the like, the inner diameter $d_I$ of the data recording region is set to 28 mm, it suffices to set the minimum value of the outer diameter $d_O$ to 58 mm, as shown at point Pc in FIG. 1.

The following is an example of various sizes which are most desirable when using the disc designed for the above described clamping system In the first place, the diameter of the centering hole 102 is enlarged to, for example, 11 mm for enlarging an area of the metal plate 103 facing the magnet 206 to assure positive clamping. By selecting the end face 104a of the projection 104 as the loading reference plane for positioning the disc in height during disc loading, the range of travel of the optical head is extended towards an inner region. The inner diameter of the data recording region $d_I$ is set to 31 mm. The outer diameter $d_O$ of the data recording area at this time is 61 mm, as an example. A point Q in FIG. 1 is a point satisfying the above conditions for the inner diameter $d_I$ and the outer diameter d0. A lead-in region having a width of 1.5 mm is formed on the inner side of the data recording region having an inner diameter of 31 mm, and lead-in data are recorded as prepits in the lead-in region. A lead out region having a width of 0.5 mm is formed on the outer side of the data recording region having an outer diameter of 61 mm and lead-in data are recorded as prepits in the lead-out region.

The above described magnet clamping system may be used in conjunction not only with the magneto-optical disk 100, but also with various other discs, such as an optical disc having an aluminum reflective surface similar to the conventional compact disc.

The cross-hatched region in FIG. 1 represents a combination of the diameter $d_I$ and $d_O$ which may be adopted when a recording/reproducing time longer than the above mentioned maximum time duration of 72 to 76 minutes is desired or when the data compression rate is to the lowered to improve the sound quality.

Figure 5:
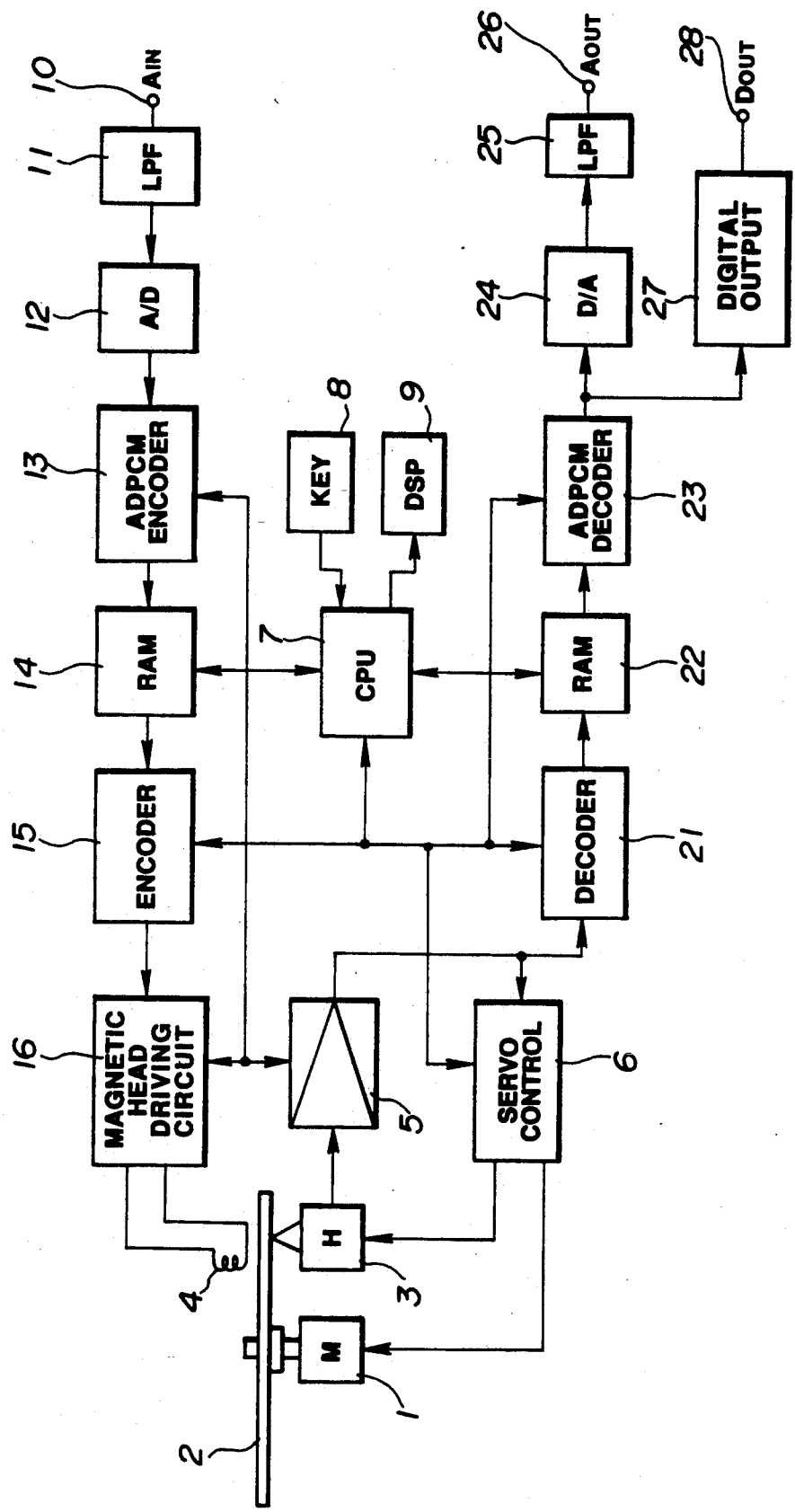

Referring to FIG. 5, an example of the disc recording/reproducing apparatus employing the above described disc-shaped recording medium is hereinafter explained.

Figure 6:
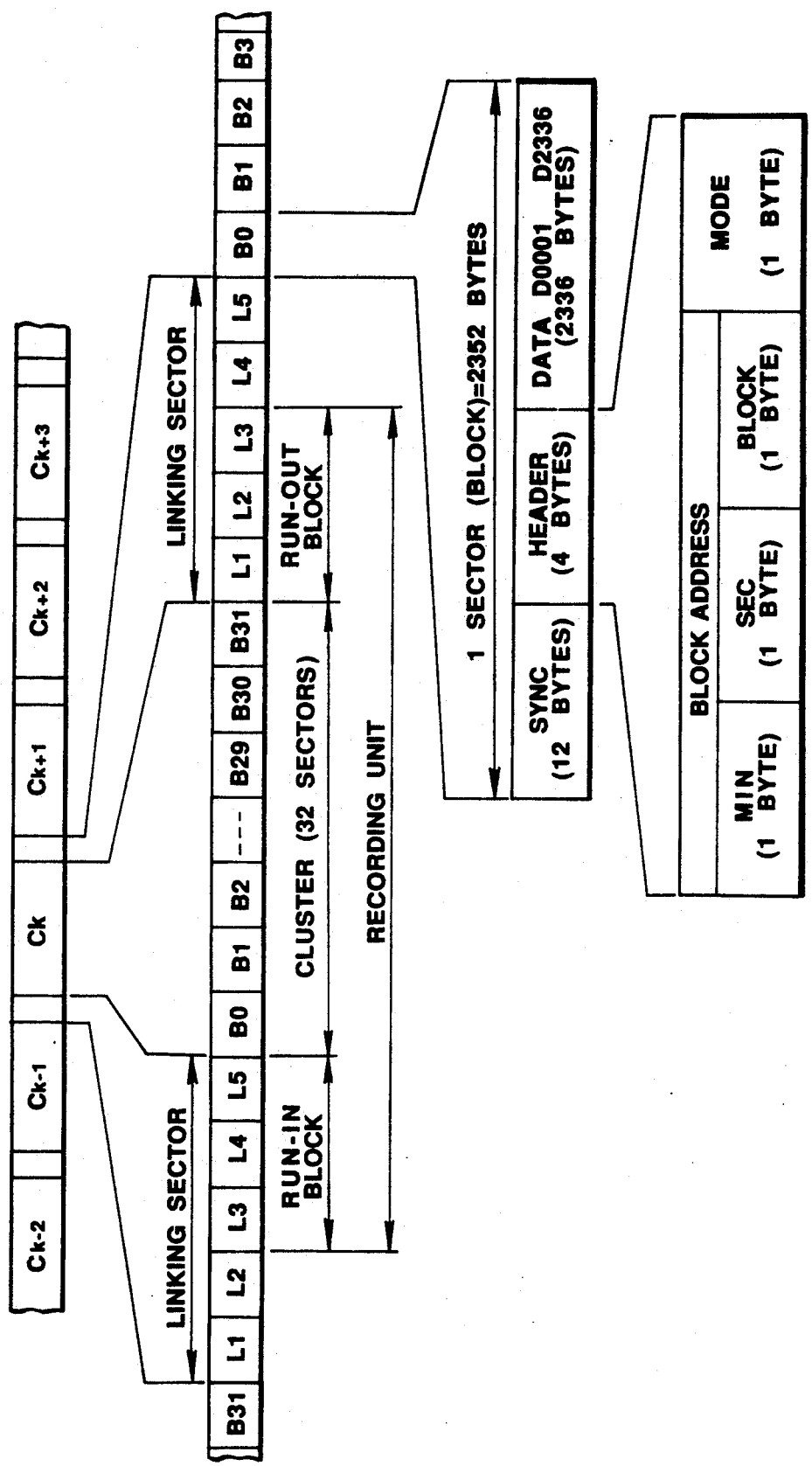
FIG. 6 is a block diagram showing a disc recording reproducing apparatus embodying the present invention.

FIG. 6 shows a schematic arrangement of the disc recording/reproducing apparatus employing the above described disc-shaped recording medium embodying tho present invention.

In the disc recording/reproducing apparatus, shown in FIG. 5, a magneto-optical disc 2 rotationally driven by a spindle motor 1 is employed as a recording medium. While a laser light is irradiated by an optical head 3 on the magneto-optical disc 2, a modulating magnetic field consistent with recording data is applied by a magnetic head 4 to the magneto-optical disc 2 for recording data along a recording track of the disc 2, by ways of a so-called magnetic field modulation recording. On the other hand, the recording track of the magneto-optical disc 2 is traced with a laser light by the optical head 3 for photomagnetically reproducing the recorded data.

The optical head 3 is constituted by a laser light source, such as a laser diode, optical components, such as a collimator lens, an object lens, a polarization beam splitter or a cylindrical lens, and a split photodetector, and is arranged for facing the magnetic head 4 with the magneto-optical disc 2 in-between. For recording data on the magneto-optical disc 2, the optical head 3 irradiates a laser light on a target track on the magneto-optical disc 2 for recording data by thermomagnetic recording. The modulating magnetic field consistent with the recording data is applied to the target track by the magnetic head 4 which is driven by a head driving circuit 16 of the recording system which will be explained subsequently. The optical head 3 detects a laser light irradiated on and reflected by the target track for detecting the focusing error by a so-called astigmatic method as well as detecting the tracking error by a so called push-pull method. When reproducing data from the magneto-optical disc 2 the optical head 3 detects the difference of a polarization angle Kerr rotation angle) of the reflected laser light from the target track to produce playback signals.

The output of the optical head 3 is supplied to an RF circuit 5. The RF circuit 5 extracts the focusing error signal and the tracking error signal from the output of the optical head 3 and transmits the extracted signals to a servo control circuit 6 while converting the reproduced signals into corresponding binary signals and supplying the binary signals to a decoder 21 of the reproducing system, which will be explained subsequently.

The servo control circuit 6 is constituted by a focusing servo circuit, a tracking servo circuit, a spindle motor servo control circuit and a thread servo control circuit. The focusing servo control circuit executes focusing control of an optical system of the optical head 3 so that the focusing error signal will be reduced to zero. The tracking servo control circuit execute tracking control of the optical system of the optical head 3 so that the tracking error signal will be reduced to zero. The spindle motor servo control circuit controls the spindle motor 1 for rotationally driving the magneto-optical disc 2 at a predetermined rotational velocity, such as at a constant linear velocity. The thread servo control circuit causes the optical head 3 and the magnetic head 4 to be moved to a target track position on the magneto-optical disc 2 designated by the system controller 7. The servo control circuit 6. Which performs these various control operations, transmits an information indicating operating states of components controlled by the servo control circuit 6 to the system controller 7.

Although the present disc recording reproducing apparatus has been described with reference to recording and reproduction of the B-level stereo mode ADPCM audio data, the present invention may also be applied to recording and/or reproduction of other mode ADPCM audio data in other CD-I system.

With the above described disc-shaped recording medium according to the present invention, the inner diameter of the data recording region is set to 32 to 50 mm, the outer diameter of the data recording region for the inner diameters of 32 mm is set to 60 to 62 mm and the outer diameter of the data recording region for the inner diameter of 60 mm is set to 71 to 73 mm, so that the recording medium may be used with a small-sized portable disc recording/reproducing apparatus while the compressed audio data with the compression ratio of ¼ are recorded on the recording medium to realize a playback time about as long as that of a standard 12 cm CD. That is, when recording compression audio data with the compression ratio of ¼, a track pitch of 1.6 $\mu$m and a liner velocity of 1.2 to 1.4 m/s, the recording/reproducing time may amount to about 60 minutes at the minimum and about 72 to 76 minutes the average.

To the system controller 7 are connected a key input operating section 8 and a display section. This system controller 7 controls the recording system and the reproducing system with the operating mode designated by an operating input information from the key input operating section 8. The system controller 7 supervises, on the basis of a sector-by-sector address information reproduced from the recording track of the magneto-optical disc 2 by the header time or sub-Q data, the recording position as well as the reproducing position on the recording track traced by the optical head 3 and the magnetic head 4. The system controller 7 causes a bit compression mode to be displayed on a display section g on the basis of bit compression mode data in the reproduced data obtained from the RF circuit 5 by means of a reproducing system as later described, or of bit compression mode data in the ADPCM encoder 13 switchingly selected by the key input operating section 8. The system controller also causes the playback time to be displayed on the display section g on the basis of a data compression ratio and the reproducing position data on the recording track in the bit compression mode.

For displaying the playback time, the sector-by-sector address information (absolute time information), reproduced from the recording track of the magneto-optical disc 2 with the head time or sub-Q data, is multiplied by a reciprocal of the data compression ratio in the bit compression mode (four in case of ¼ compression)to find an actual time information for display on the display section 9. It is noted that, if an absolute time information has been recorded (preformatted) on a recording track of a magneto-optical disc, the preformatted absolute time information may be read during recording and multiplied by the reciprocal of the data compression ratio for display of the current position in the form of the actual recording time.

It is noted that the recording system of the disc recording/reproducing apparatus is provided with an A/D converter 12 to which an analog audio signal $A_{IN}$ is supplied from an input terminal 10 by way of a low-pass filter 11.

The A/D converter 12 quantizes the audio signal $A_{IN}$. The digital audio data obtained at the A/D converter 12 is transmitted to an adaptive differential pulse code modulating encoder (ADPCM encoder) 13. The ADPCM encoder 13 processes the prescribed transfer rate digital audio data quantized from the audio signal $A_{IN}$ by the ADPCM encoder 13 by a data compressing operation in conformity to the various modes in the CD-I system shown in Table I, and has its operating mode designated by the system controller 7. For example, in the B-level mode of Table 1, the digital audio data are processed into compressed data (ADPCM audio data) having a sampling frequency of 37.8 kMZ and the number of bits per sample equal to 4, before being supplied to a memory 14. The data transfer rate with the B-level stereo mode is reduced to 18.75 sectors/second.

In the embodiment of FIG. 1, it is assumed that the sampling frequency of the A/D converter 12 is fixed at the sampling frequency of the standard CD-DA format, or 44.1 kHz, and that, in the ADPCM encoder 13, bit compression from 16 bits to 4 bits is performed after conversion of the sampling rate in conformity to the compression mode, for example, from 44.1 kHz to 37.8 kHz for level B. Alternatively, the sampling frequency of the A/D converter 12 itself may be switchingly controlled as a function of the compression modes. In this case, the cut-off frequency of the low-pass filter 11 is also switchingly controlled as a function of the switchingly controlled sampling frequencies of the A/D converter 12. That is, the sampling frequency of the A/D converter 12 and the out-off frequency of the low-pass filter 11 may be simultaneously controlled in dependence upon the compression modes.

The memory 14 is used as a buffer memory in which data writing and readout are controlled by the system controller 7 and which transiently stores DPCM audio data supplied from the ADPCM encoder 13 for continuous recording on the disc as the occasion may demand. That is, in the B-level stereo mode, the compressed audio data supplied from the ADPCM encoder 13 has its transfer rate reduced to 18.75 sectors/second, these compressed data being continuously written in the memory 14. Although it suffices to record the compressed data (ADPCM data) at a rate of every four sectors, as explained hereinbefore, it is practically impossible to record the data at this rate on the real time basis, and hence the sectors are recorded continuously as later explained. Such recording is performed in a burst fashion (discontinuously) at a standard data transfer rate of 75 sectors/second, by taking advantage of a quiescent period, with a cluster, composed of a predetermined number of, e.g. 32 sectors, as a data recording unit. That is, in the memory 14, the B-level stereo mode ADPGM audio data, which has been continuously written at the lower transfer rate of 18.76 (=75/4) sectors/second conforming to the data compression ratio, is read out as record data in a burst fashion at the above mentioned transfer rate of 75 sectors/second. The overall data transfer rate of the data read out and recorded in this way, inclusive of the non-recording period, is a lower rate of 18.75 sectors/second. However, an instantaneous data transfer rate within the time of the burst-like recording operation is equal to the above mentioned standard rate of 75 sectors/second. Therefore, if the rotational velocity of the disc is the same as that of the standard CD-DA format, that is, a constant linear velocity, recording is made at the same recording density and with the same recording pattern as those of the CD-DA format.

The ADPCM audio data read out from memory 14 in a burst fashion at the transfer rate of 75 sectors/second, that is, the record data, is supplied to an encoder 15. With a data string supplied from memory 14 to encoder 15, a data unit continuously recorded with each recording is composed of a plurality of, e.g. 32 sectors, and a few cluster-linking sectors arrayed before and after the cluster. The cluster-linking sector has a length longer than the interleaving length at the encoder 15, so that even when the sector undergoes interleaving, data of other clusters remain unaffected. Details of the recording on the cluster-by-cluster basis will be discussed later by referring to FIG. 6.

The encoder 15 processes the record data supplied in a burst fashion from tho memory 14 with an error correcting coding operation, such as by parity addition or interleaving, or eight-to-fourteen modulation (EFM). The recording data, thus encoded by the encoder 15, is supplied to the magnetic head driving circuit 16.

To the magnetic head driving circuit 10 is connected the magnetic head 4 which drives the magnetic head 4 to apply a modulating magnetic field conforming to the record data to the magneto-optical disc 2.

On the other hand, the system controller performs a recording position controlling operation for the memory 14 and, based on the controlling operation, performs a disc recording position control so that the above mentioned record data read out in a burst fashion from memory 14 will be recorded continuously on the recording track of the magneto-optical disc 2. For the recording position control, the record position of the record data read out in a burst fashion from the memory 14 is supervised by the system controller 7, and control signals designating the record position on the recording track of the magneto-optical disc 2 are supplied to the servo control circuit 6.

The reproducing system in the disc recording/reproducing apparatus is hereinafter explained.

The reproducing system is adapted for reproducing the record data continuously recorded by the above described recording system on the recording track of the magneto-optical disc 2, and is provided with a decoder 21, to which is supplied a playback output, which has been generated by the optical head 3 tracing the recording track on the magneto-optical disc 3 with a laser light, and which has been converted into binary format signals by the RF circuit 5.

The decoder 21 is associated with the encoder 15 in the above described recording system, and processes the playback output, converted into the binary format signals by the RF circuit 6, with the above mentioned decoding for error correction and EFM decoding and reproduces the above mentioned B level stereo mode DPCM audio data at a transfer rate of 75 sectors/second which is faster than the normal transfer rate in the above mentioned B level stereo mode. The reproduced data, produced by the decoder 21, is supplied to a memory 22.

The memory 22 has its data writing and readout controlled by the system controller 7 so that the playback data supplied from decoder 21 at a transfer rate of 76 sectors/second is written in a burst fashion at the transfer rate of 76 sectors/second. Also the playback data written in a burst fashion at the transfer rate of 76 sectors/second in the memory 22 are continuously read out therefrom at the regular B-level stereo mode of 18.75 sectors/second.

The system controller 7 also performs a memory control of writing the reproduced data in the memory 22 at the transfer rate of 75 sectors/second continuously reading out the playback data from the memory 22 at the transfer rate of 18.75 sectors/second.

The system controller 7 performs, besides the above mentioned memory control operation for memory 22, a reproducing position control from the recording track of the magneto-optical disc 2, in such a manner that the playback data written in a burst fashion by the above mentioned memory control in the memory 22 is reproduced continuously from the recording track of the disc 2. The reproducing position control is performed by supervising a reproducing position on the disc of the above mentioned playback data written in a burst fashion in the memory 22 by system controller 76 and by supplying a control signal designating the reproducing position on the recording track of the magneto-optical disc 2 to the servo control circuit 6.

The B-level stereo mode ADPCM audio data, obtained as playback data read out continuously from memory 22 at a transfer rate of 18.75 sectors/second, are supplied to the ADPCM decoder 23.

This ADPCM decoder 23 is associated with the ADPCM encoder 13 of the recording system, and has its operating mode designated by system controller 7. With the present disc recording/reproducing apparatus, the B-level stereo mode ADPCM audio data are expanded by a factor of four for reproducing the digital audio data. The reproduced digital audio data is transmitted by the ADPCM decoder 23 to a D/A converter 24.

The D/A converter 24 causes the digital audio data supplied from the ADPCM decoder 23 to be converted into an analog audio signal $A_{OUT}$. The analog audio signal $A_{OUT}$, obtained at the D/A converter 24, is outputted via a low-pass filter 25 at an output terminal 26.

The reproducing system of the disc recording/reproducing apparatus of the present embodiment is provided with a digital outputting function so that the digital audio data at the output of the ADPCM decoder 23 is outputted at a data output terminal 28 via a digital output encoder 27 as a digital audio signal $D_{OUT}$.

The recording/reproducing operation by the above described disc recording/reproducing apparatus will be explained more detail.

The record data, that is data read out from the memory 14, is arranged into a cluster at an interval of a predetermined number of, e.g. 32, sectors or blocks, and several cluster-linking sectors are arrayed between adjoining clusters. In more detail, referring to FIG. 6, each cluster $C_n$ consists of 32 sectors or blocks B0 to B31, and five linking sectors L1 to L5 are arranged between these clusters $C_n$ for linking the adjoining clusters. For recording a cluster, such as a k'th cluster $C_k$, the 32 sectors B0 to B31 of the cluster $C_k$ and the linking clusters ahead and at the back of the cluster $C_k$, namely the three sectors L3 to L5 towards the cluster $C_{k-1}$ (run-in blocks) and the three blocks L1 to L3 towards the cluster $C_{k+1}$, making a total of 38 sectors, are recorded as one unit. The 38-sector record data are transmitted from the memory 14 to the encoder 15 where interleaving is carried out for data rearrangement over a distance of up to 10-8 frames corresponding to ca. 1.1 sector. However, the data within the cluster $C_k$ are safely contained within a range of from the run-in blocks L3 to L5 to the run-out blocks L1 to L3 without affecting the remaining clusters $C_{k-1}$ or $C_{k+1}$. Meanwhile, dummy data, such as O, are arrayed in the linking sectors L1 to L5 to avoid adverse effects which interleaving might have on the data per se. When recording the next cluster $C_{k+1}$, three sectors L3 to L5 of the five linking sectors L1 to L5 between the current cluster and the next cluster $C_{k+1}$ are used as the run-in blocks, so that the sector L3 is recorded superfluosly without causing any inconvenience. The sector L3 of the run-in block or the sector L3 of the run-out block may be omitted, so that recording may be performed with the remaining 37 sectors as a unit.

By recording on the cluster-by-cluster basis, there is no necessity of taking account of an interference with the adjoining clusters by interleaving, so that data processing may be simplified significantly. On the other hand, if the record data should be unable to be recorded normally due to malfunctions, such as defocusing, detracking, etc., re-recording may be made on the cluster-by-cluster basis and, if the record data should be unable to be reproduced effectively, re-reading may be made on the cluster-by-cluster basis.

Meanwhile, each sector or block consists of 12 synchronizing bits, 4 header bytes and 2336 bytes of data per se D0001 to D2336, arrayed in this order, making a total of 2352 bytes. This sector or block array is represented as a two-dimensional array, as shown in FIG. 7, wherein the 12 synchronization bits consist of the first byte OOH, ten bytes FFH and the last byte OOH in the hexadecimal system (H is a hexadecimal number). The next 4-byte header consists of address parts for minute, second and block, each one byte, and a mode data byte. These mode data mainly indicate a CD-ROM mode, while a sector structure shown in FIGS. 6 or 7 corresponds to the mode 2 of the CD-ROPM format. The CD-I is a standard employing the mode 2 and the contents of the data D0001 to D0008 are prescribed as shown in FIG. 8.

Figure 9:
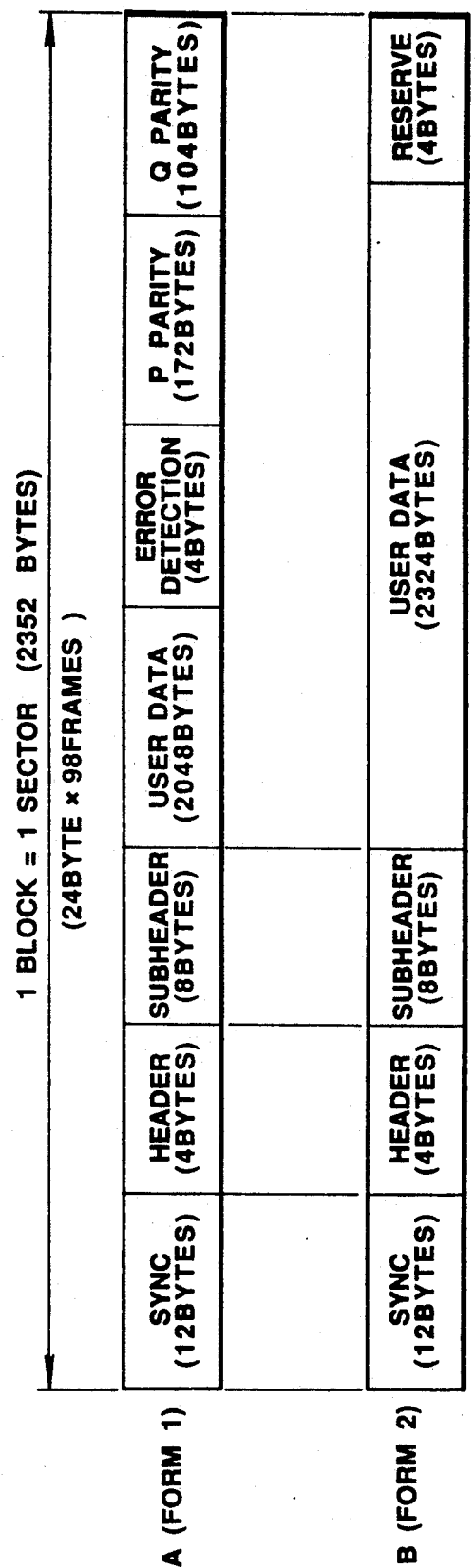
FIG. 9 shows an in-sector data structure of a so-called CD-I format.

FIG. 9 shows forms 1 and 2 of the CD-I standard, in which 12 synchronizing bits and 4 header bytes are the same as those of the CD-ROM mode 2 shown in FIGS. 6 and 7. The next 8 subheader bytes are prescribed as shown in FIG. 8 wherein data D0001 and D0005 are file numbers, data D0002 and D0006 are channel numbers, data D0003 and D0007 are subcode data and data D0004 and D0008 are data type data. The data D0001 to D0004 and data D0005 to D0008 are the same data written in duplicate. The next 2328 bytes consist of 2048 user data bytes, four error-detecting bytes, 172 P parity bytes and 104 Q parity bytes, for from 1 to FIG. 9A. This form L is used for recording letter data, binary data and high compression video data. The 2328 bytes for form 2 of FIG. 9B consist of 2324 user data bytes, downstream of the sub-header data, and the remaining 4 reserve data bytes. This form 2 is sued for recording compressed audio data or video data. In the case of the compressed audio data, 18 128-byte sound groups (2304 bytes) are arrayed in the 2324 user data bytes, with the remaining 20 bytes representing a vacant space.

Figure 10:
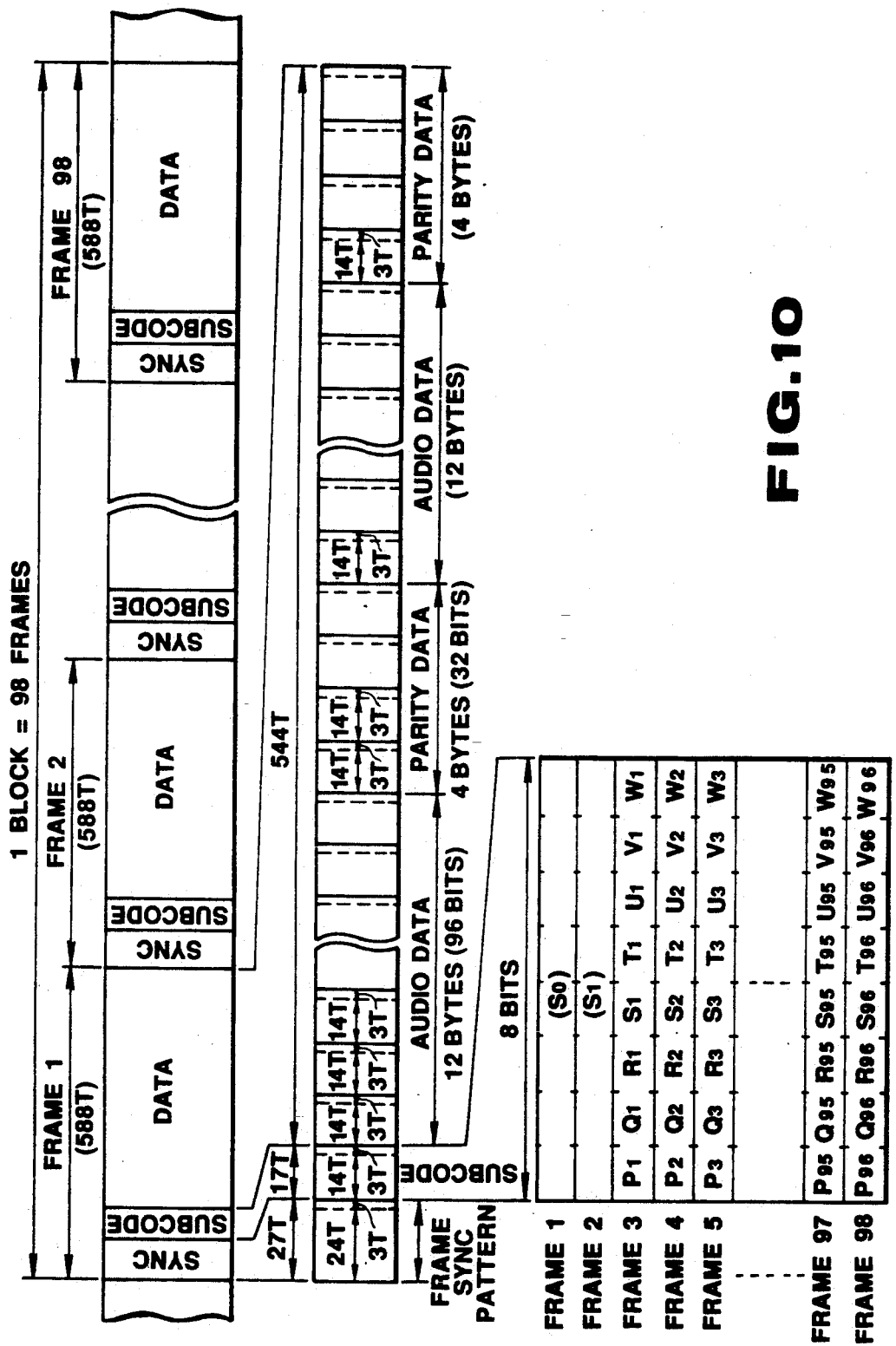
FIG. 10 shows a format of a frame and a block or sector in the CD-standard.

Meanwhile, when recording the above-described sector-based data on a disc, a coding operation such as parity addition or interleaving or EFM encoding is carried out by the encoder 15, so that recording is performed with a recording format shown in FIG. 10.

Referring to FIG. 10, each block or sector consists of 98 frames of 1st to 98th frames, with each frame being 588 times a channel clock period T(588T). Within each frame, there are a frame synchronizing pattern part of 24T (plus 3T for linking), a subcode part of 14T (plus 3T for linking) and data part of 544T (for audio data and parity data). The 544 T data part consists of 12 bytes or symbols of audio data, 4 bytes of parity data, 12 bytes of audio data and 4 bytes of parity data which have been processed by EFM (eight-to-fourteen modulation). Audio data in each frame is constituted by 24 bytes or 12 words because each word of the audio sample data consists of 16 bits. The subcode part is the 8-bit subcode data which has undergone EFM and is arrayed in a block with 98 frames as a unit, each bit constituting one of eight subcode channels P to W. The subcode parts of the first and second frames are block synch patterns $S_0$ and $S_1$ which violate the EFM rule, each of the subcode channel P to W being constituted by 967 bits for the third to 98 the frames.

The above mentioned audio data, recorded after interleaving, are deinterleaved during reproduction into audio data of a data array conforming to the regular time sequence. The CD-I data, such as are shown in FIGS. 7 and 9, may be recorded in place of the audio data.

Figure 11:
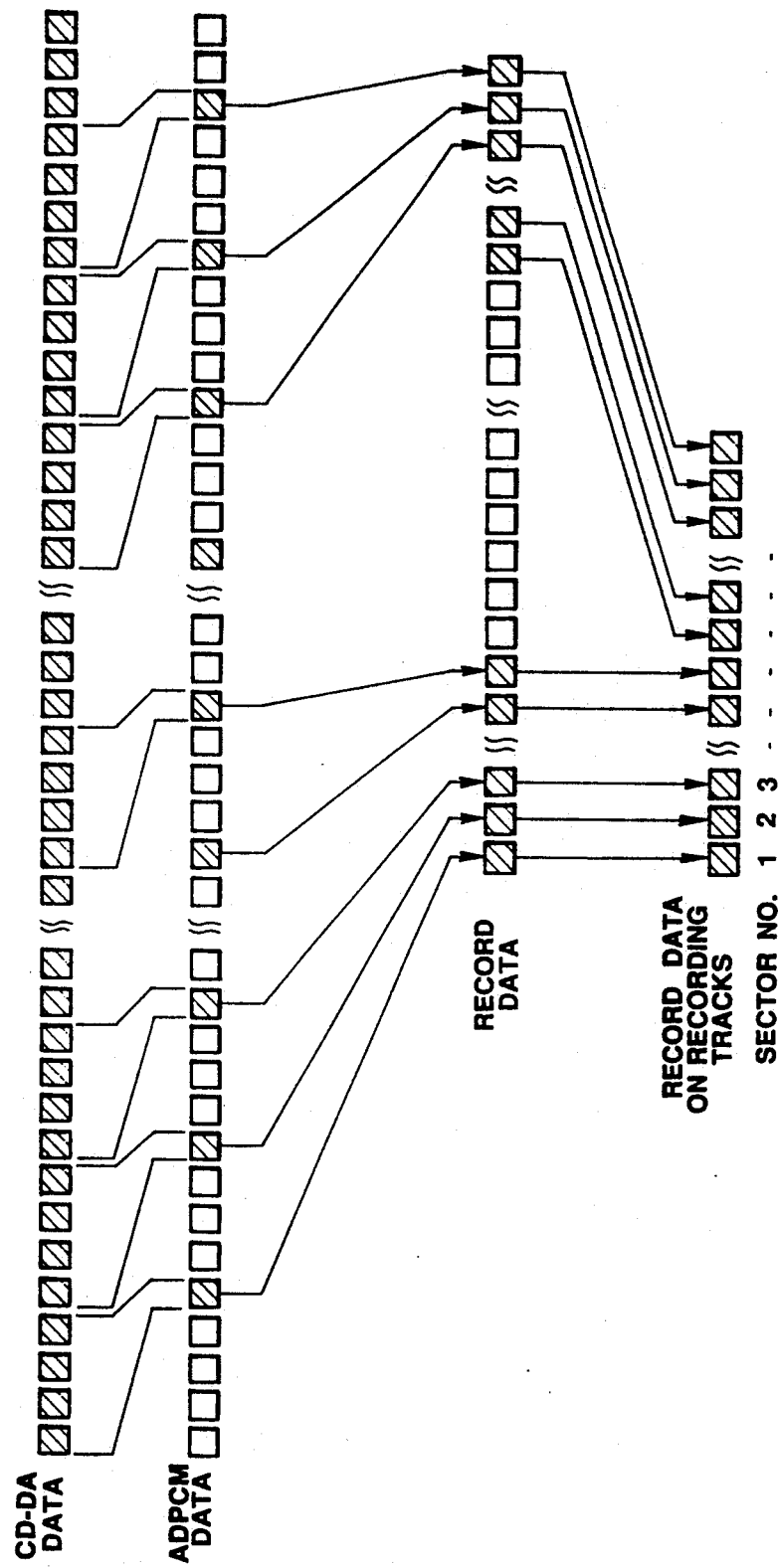
FIG. 11 shows a data format employed in the above described disc recording reproducing apparatus.

Meanwhile, digital data obtained at the A/D converter 12 in the disc recording/reproducing apparatus shown in FIG. 5, are data similar to those of the CD-DA format, that is the audio PCM data with the sampling frequency of 44.1 kHz, the number of quantization bits equal to 16 and a data transfer rate of 75 sectors/second, as shown in FIG. 11. When the data is transmitted to the ADPCM encoder 13 so as to be bit-compressed to the above-mentioned stereo mode, the digital data are converted into data with a sampling frequency of 37.8 kHz and the number of quantization bits is compressed to four bits. Thus the output data are the ADPCM audio data having the data transfer rate reduced by ¼, or to 18.75 sectors/second. The B level stereo mode ADPCM audio data, continuously outputted at a transfer rate of 18.75 sectors/second from the ADPCM encoder 13, are supplied to the memory 14.

Figure 12:
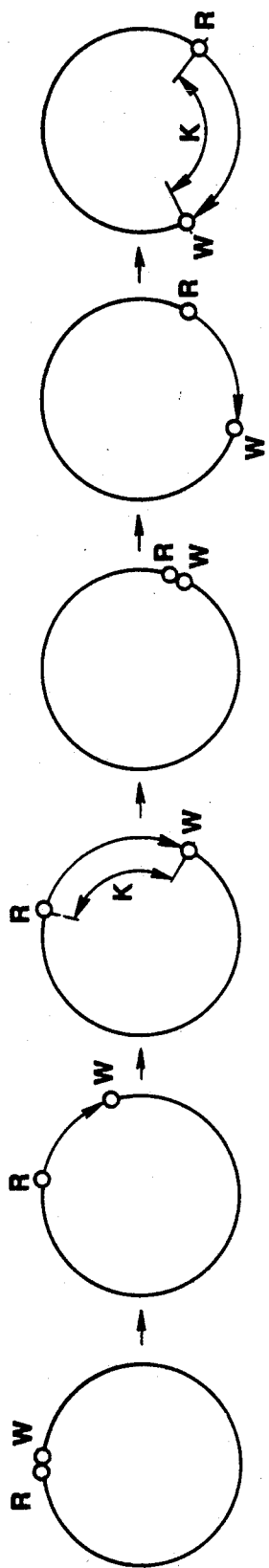
FIG. 12 shows the status of a controlled memory of a recording system of the disc recording/reproducing apparatus shown in FIG. 4.

Referring to FIG. 12, the system controller 7 controls the memory 14 in such a manner that a write pointer W of the memory 14 is continuously incremented at a transfer rate of 18.75 sectors/second to continuously write the ADPCM audio data in the memory 14 at a transfer rate of 18.75 sectors/second and, when the data volume of the ADPCM audio data stored in the memory 14 exceeds a predetermined volume K, a read pointer R of the memory 14 is incremented in a burst fashion at a transfer rate of 75 sectors/second to read out a predetermined volume K of the ADPCM data in a burst fashion from the memory 14 as record data at the above mentioned transfer rate of 75 sectors/second. It is noted that the above predetermined volume K has one-cluster data as a unit.

That is, in the recording system of the disc recording-/reproducing apparatus shown in FIG. 5, the ADPCM audio data continuously outputted at the transfer rate of e.g. 18.75 sectors per second from the ADPCM encoder 13 are written in the memory 14 at the above mentioned transfer rate of 18.75 sectors/second. When the data volume of the ADPCM data stored in the memory 14 exceeds the predetermined data volume K, the data volume K of the ADPCM audio data is read out in a burst fashion from memory 14 at the transfer rate of 75 sectors/second as record data, so that input data can continuously written in the memory 14 while a data write region in excess of a predetermined volume is perpetually maintained within the memory 14. By recording the recording positions on the recording track of the magneto-optical disc 2 under control by the system controller 7, the record data read out in a burst fashion from the memory 14 can be recorded consecutively on the recording track on the magneto-optical disc 2. Since a data vacant region in excess of a predetermined volume is maintained in the memory 14, data can be continuously written in the data-depleted region in excess of the predetermined volume even if the system controller 7 detects that a track jump etc. has occurred due to disturbances or the like to discontinue a recording operation on the magneto-optical disc 2, and the resetting operation may be carried out in the interim. Thus, input data can be continuously recorded without dropout on the recording track of the magneto-optical disc 2.

Meanwhile, header time data corresponding to the physical address of the sectors are annexed to the ADPCM audio data on the sector-by-sector basis, and recorded on the sector-by-sector basis on the magneto-optical disc 2. Table of contents data indicating the record region and the recording mode are recorded in a table of-contents region.

Figure 13:
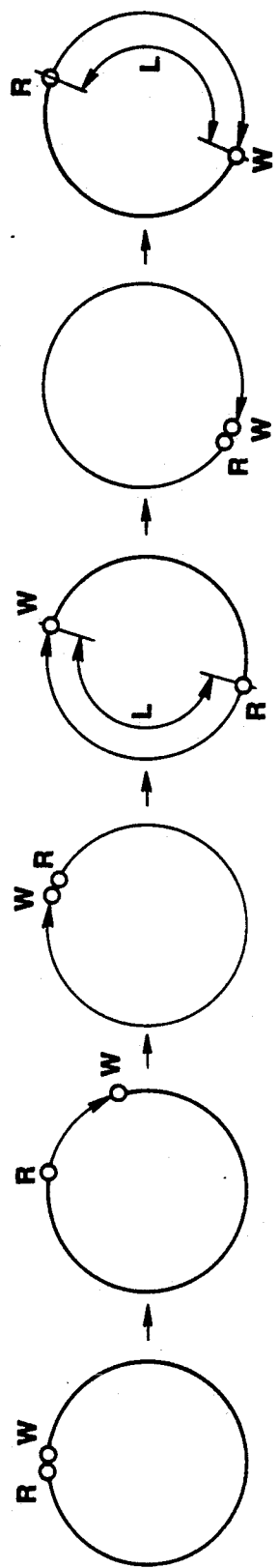
FIG. 13 shows the status of a controlled memory of a reproducing system of the disc recording/reproducing apparatus shown in FIG. 4.

In the reproducing system of the disc recording/reproducing apparatus shown in FIG. 5, the system controller 7 controls the memory 22 in such a manner that, as shown in FIG. 13, the write pointer w of the memory 22 is incremented at a transfer rate of 75 sectors/second to write the reproduced data in the memory 22 at the transfer rate of 75 sectors/second, the read pointer R of the memory 22 is continuously incremented at a transfer rate of 18.75 sectors/second to continuously read out the playback data from memory 22 at the transfer rate of 18.75 sectors/second, and the write pointer W of the memory 22 is intermittently incremented at the transfer rate of 75 sectors/second in a burst fashion, so that, when the write pointer W catches up with the read pointer R, writing is discontinued. When the data volume of the playback data stored in the memory 22 is lower than the predetermined volume L, writing is started again.

Thus, with the above described reproducing system of the disc recording/reproducing apparatus, the system controller 7 controls the memory 22 in such a manner that the B-level stereo mode DPCM audio data reproduced from the recording track of the magneto-optical disc 2 is written in a burst fashion in the memory 22 at a transfer rate of 75 sectors/second, and read out continuously from the memory 22 as playback data at the transfer rate of 18.75 sectors/second, so that the playback data may be continuously read out from the memory 22 while the data vacant region in excess of the predetermined volume L is perpetually maintained within memory 22. Also the playback data intermittently read out from the magneto-optical disc 2 may be continuously reproduced from the recording track on the magneto-optical disc 2 by controlling the reproducing position on the recording track of the magneto-optical disc 2 by the system controller 7. In addition, the data read-out region in excess of the predetermined volume L is perpetually maintained in the memory 22, as described previously, so that, even when the system controller 7 should detect the occurrence of a track jump etc. due to, for example, disturbances, and the operation of reproducing the magneto-optical disc 2 is discontinued, the playback data may be read out from the data readout region having a space in excess of the predetermined data volume to continue the outputting of the analog audio signals and the resetting operation may be executed in the interim.

What is claimed is:

1. A disc-shaped recording medium including a disc base plate having a recording surface and a second surface opposite the recording surface, wherein a data recording region of the recording surface is composed of material in which data can be recorded by optical means, wherein the data recording region has an inner diameter within a range of from 28 mm to 50 mm, and an outer diameter, wherein the outer diameter is in a range from 58 mm to 62 mm when the inner diameter is equal to 28 mm, wherein the outer diameter is in a range from 71 mm to 73 mm when the inner diameter is equal to 50 mm, wherein the outer diameter is greater than 58 mm and less than 68 mm when the inner diameter is greater than 28 but less than 42 mm, and wherein the outer diameter is greater than 65 mm and less than 73 mm when the inner diameter is greater than 42 mm but less than 50 mm.

2. The disc-shaped recording medium of claim 1, wherein the disc base plate has a centering hole extending therethrough, the second surface has a signal recording layer thereon, and the recording surface has a projecting portion around said centering hole.

3. The disc-shaped recording medium of claim 2, also including:
a disc table having a centering member for engaging the projecting portion to center the disc-shaped recording medium relative to the disc table; and
recording means for continuously recording compressed digital data on the data recording region when the centering member is engaged with the projecting portion.

4. The disc-shaped recording medium of claim 3, wherein the recording means also records data on a lead-in region of the recording surface, wherein the disc base plate has a centering hole extending therethrough, and wherein the lead-in region is an annular region of the recording surface between the data recording region and the centering hole.

5. The disc-shaped recording medium of claim 3, wherein said compressed digital data are compressed audio data having a compression ratio substantially equal to ¼.

6. A disc-shaped recording medium including a disc base plate having a recording surface and a second surface opposite the recording surface, wherein a data recording region of the recording surface is composed of material in which data are prerecorded, wherein the data recording region has an inner diameter within a range of 28 to 50 mm, and an outer diameter, wherein the outer diameter is in a range from 58 mm to 62 mm when the inner diameter is equal to 28 mm, the outer diameter is in a range from 71 mm to 73 mm said inner diameter is equal to 50 mm, the outer diameter is greater than 58 mm and less than 68 mm when the inner diameter is greater than 28 mm but less than 42 mm, and the outer diameter is greater than 65 mm and less than 73 mm when the inner diameter is greater than 42 mm but less than 50 mm.

7. A disc-shaped recording medium as claimed in claim 6, wherein the disc base plate has a centering hole extending therethrough, the second surface has a signal recording layer thereon, and the recording surface has a projecting portion around said centering hole.

8. A disc-shaped recording medium as claimed in claim 7, also including:
a disc table having a centering member for engaging the projecting portion to center the disc-shaped recording medium relative to the disc table; and
recording means for continuously recording on the data recording region when the centering member is engaged with the projecting portion.

9. A disc-shaped recording medium as claimed in claim 8, wherein said compressed digital data are compressed audio data having a compression ratio substantially equal to ¼.

10. The disc-shaped recording medium of claim 8, wherein the recording means also records data on a lead-in region of the recording surface, wherein the disc base plate has a centering hole extending therethrough, and wherein the lead-in region is an annular region of the recording surfaces between the data recording region and the centering hole.

* * * * *